United States Patent [19]

Freifeld et al.

[11] 4,061,875

[45] Dec. 6, 1977

[54] AUDIO PROCESSOR FOR USE IN HIGH NOISE ENVIRONMENTS

[76] Inventors: Stephen Freifeld, 55 Lancaster Court, New Providence, N.J. 07974; Paul Yanick, Jr., 673 Wood Ave., Edison, N.J. 08817

[21] Appl. No.: 770,618

[22] Filed: Feb. 22, 1977

[51] Int. Cl.² .............................................. H04M 1/19
[52] U.S. Cl. .............................................. 179/1 P
[58] Field of Search ............ 179/1 P, 107 R, 107 FD

[56] References Cited

U.S. PATENT DOCUMENTS 3,894,195  7/1975  Kryter .......................... 179/107 FD
3,952,158  4/1976  Kyle et al. ........................ 179/1 P

*Primary Examiner*—Kathleen H. Claffy
*Assistant Examiner*—E. S. Kemeny
*Attorney, Agent, or Firm*—Arthur L. Plevy

[57] ABSTRACT

There is disclosed apparatus for providing improved hearing acuity in the presence of high intensity background noise, such as that which exists at an industrial site.

The apparatus employs an input microphone which is adapted to receive audio information including noise from the environment. The output of the microphone is applied to an expander circuit, which functions to expand the high pass audio frequency band according to the nature and intensity of the noise. In a first mode expansion is provided at a variable ratio and threshold which are selected according to environmental noise. The expanded audio signal is applied to a compressor limiter module to reduce the level and limit the amplitude of the signal within predetermined and safe limits. The compressor limiter output signal is applied to an adjustable low pass filter, which serves further to accommodate the processed signal to a particular user and to limit the frequency range of the output signals. This low pass filter has an output applied to a linear attenuator which serves to reduce the amplitude of the processed signal depending upon the particular noise levels at the site. This output signal is applied to a speaker which is located in proximity with the ear of a user to allow him to communicate relatively normally in high noise environments. Additional modes are described which employ both expansion and compression prior to limiting.

21 Claims, 6 Drawing Figures

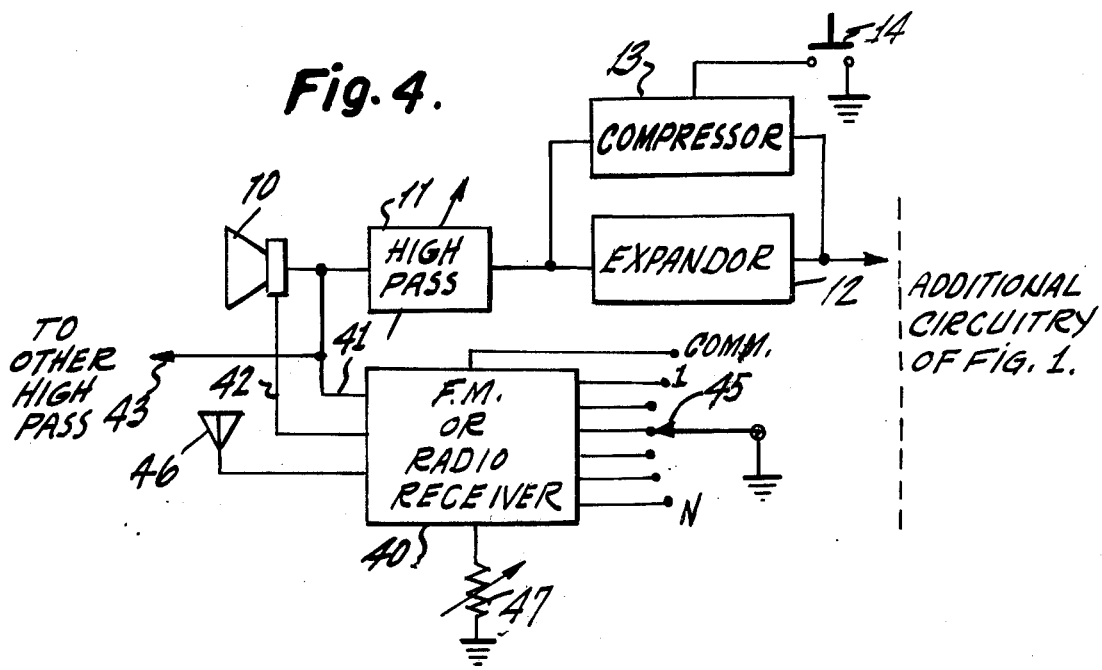
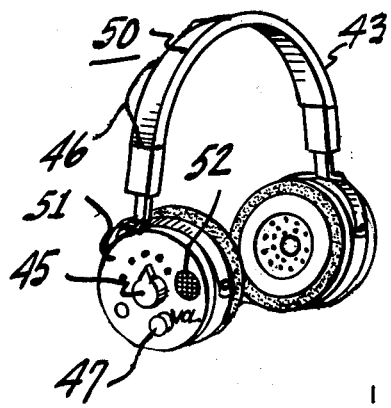
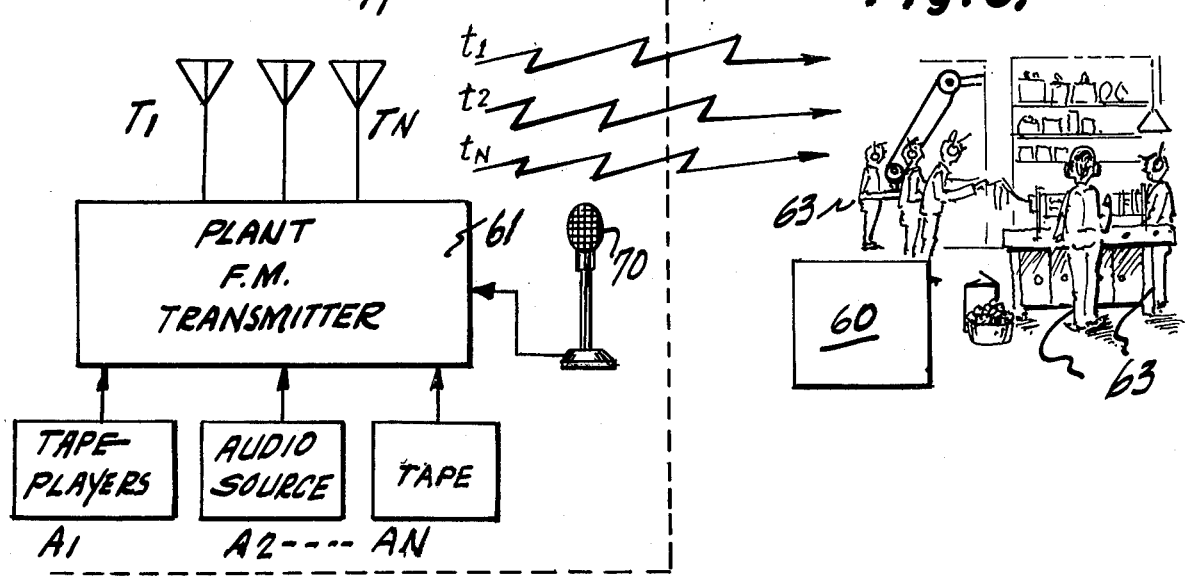

AUDIO PROCESSOR FOR USE IN HIGH NOISE ENVIRONMENTS

BACKGROUND OF INVENTION

This invention relates to an audio processing device and in particular to a processor which affords noise suppression in high noise ambient backgrounds.

Presently, industrial noise is a substantial problem and has resulted in wide concern throughout government and industry. Many huge manufacturing plants such as most automobile facilities, steel facilities and so on, employ thousands of people who work in production areas where the noise levels are extremely high due to the operation of heavy and complex machinery. The problem is of such concern that the federal government as well as local authorities have set standards involving the levels and the time of exposure to which a typical employee can be subjected to. In general, the Occupational Safety and Health Act (O.S.H.A.) has set standards indicating noise level and the amount of hours an employee can work under such conditions. Generally speaking, the higher the noise level, the less time an employee can spend in that environment.

In order to circumvent such problems, many plants require employees to wear molded earpieces or to insert appropriate plugs into their ears to attempt to reduce the noise level which they are subjected to. A further problem is present in employing such devices in that due to the noise as well as the attenuation afforded by such devices such employees tend to shout at one another in order to communicate. The shouting has resulted in permanent damage to vocal cords while further affecting the auditory functions of an individual. These devices further do not sufficiently alleviate the noise problem as they cannot substantially reduce the levels.

Even with the advent of modern technology, the situation has not been alleviated and in fact, based on increased production requirements and so on, the situation has actually worsened. It would, therefore, be accurate to state that huge sums of money are expended each and every year based on workmans compensation claims, physician and operating expenses, machinery modification and so on, in an attempt to compensate for and to alleviate these problems. Generally speaking, noise has the effect of reducing auditory thresholds which serve to reduce the dynamic range of the ear. Furthermore, exposure to high levels of noise can result in permanent auditory damage as above described.

It is, therefore, an object of the present invention to provide apparatus in the form of a processor which operates to reduce the effects of chronic noise exposure and to thereby allow a user to hear and understand normal conversation presented at normal levels in a high noise environment.

Other embodiments provide for the reception of programmed music or formats for providing relaxation and relief from the burdens of industrial or assembly work.

DESCRIPTION OF PREFERRED EMBODIMENT

An audio processor apparatus for providing protection against high intensity noise levels, while relatively restoring auditory acuity for a user with normal hearing in a noisy environment comprises means responsive to a range of audio signals including noise as propagating in an environment for providing at an output an electrical signal indicative of said range, a high pass filter responsive to said electrical signal for substantially attenuating a given predetermined lower frequency portion of said range according to the type of noise present in said environment, audio processing means coupled to said filter, and including an expander for selectively expanding the range of said output signal from said filter according to the type of noise present, compressing means coupled to said expander and operative to limit the level of said expanded signal and means coupled to said compressor means for providing at an output on audible signal manifesting frequency and intensity characteristics sufficient to compensate for said noise present in said environment.

BRIEF DESCRIPTION OF FIGURES

FIG. 4 is a block diagram of an alternate embodiment employing a radio receiver.

FIG. 5 is a plan view of a headset or earphones employing a radio receiver in conjunction with the processing apparatus according to this invention.

FIG. 6 is a diagrammatic view of a plant transmitter configuration for use with the apparatus of FIGS. 4 and 5.

DETAILED DESCRIPTION OF THE FIGURES

Figure 1:
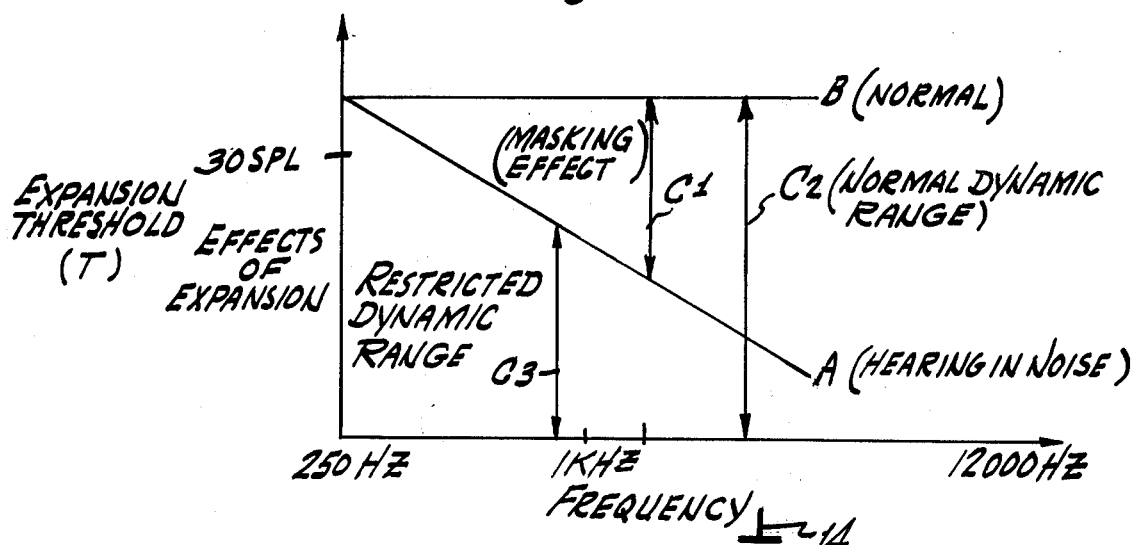
FIG. 1 is a graph depicting the dynamic range of auditory acuity in the presence of noise.

Before affording a detailed description of the apparatus according to this invention, a brief explanation will be made regarding the effects of noise on auditory thresholds. Referring to FIG. 1, there is shown a graph which demonstrates the effect of threshold loss due to noise. The abscissa of the graph is in units of frequency while the ordinate is in terms of expansion threshold. As indicated above, noise has the effect of reducing auditory thresholds which in turn, serve to reduce the dynamic range of the ear.

Line A on FIG. 1, represents the effect of threshold loss due to noise. Line C2 represents the normal dynamic range of the ear. As can be seen from line B which is parallel to the abscissa a normal hearing curve is relatively linear throughout a frequency range from 250 Hz up until 8,000 Hz or greater. As can be seen from the figure, the ear experiences a reduced dynamic range which may be represented by line C3 in the presence of noise. Line C1, in essence, represents the masking effect of noise on speech which, therefore, results in a restricted dynamic range as depicted by line C3 and which range is reduced as a function of the noise level.

In order to restore near normal hearing acuity and to widen the restricted or compressed dynamic range of the ear in the presence of noise, an expansion of the speech signals and noise can provide a method of elevating the reduced threshold. This aspect operates in conjunction with attenuation of higher intensity noise levels which serve to mask the primary speech signal. Generally speaking, as the noise level increases the lower frequcny components of the noise serve to seriously effect the intelligibility of audio information.

Figure 2:
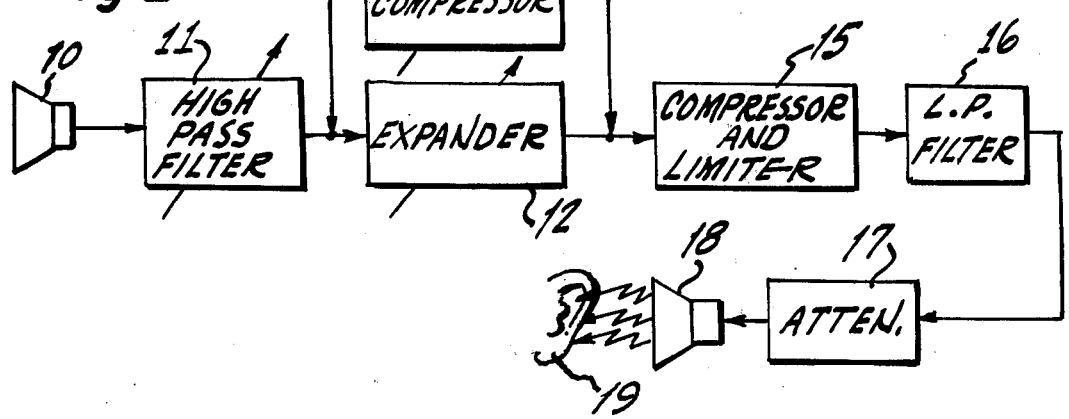
FIG. 2 is a block diagram of an audio processor according to this invention.

Referring to FIG. 2, there is shown an audio processor apparatus which is useful in providing hearing protection for people with normal hearing capability in a high noise environment. A microphone 10 is depicted. The microphone 10 may be a normal hearing aid transducer which responds to audio energy to provide at an output an electrical signal. There are many types of such microphones available and known in the prior art and such devices are extremely small and relatively efficient. Coupled to the output of the microphone 10 is a high pass filter 11. The high pass filter serves to eliminate the stronger intensity low frequency ambient noise levels and thereby improves the effective signal to noise ratio by changing the vowel to consonant ratio as well as by changing the noise to consonant ratio. Briefly, frequency consonants of much environmental noise are predetermined in the lower frequency region of the audio spectrum (below 1,500 Hz). It is these low frequency ambient noise consonants which are eliminated by the high pass filter 11. The high pass filter 11 is shown as an adjustable device. In essence, the high pass filter is adjusted to provide variable frequency breakpoints in ⅓ octave steps. The frequency breakpoints of this high pass filter can be varied from 250 Hz to 1,500 Hz in the octave steps denoted above. The filter is defined to have a variable bass roll-off at each of the breakpoints which roll-off can provide a 6, 12, or 18 db roll-off per octave. An example of suitable high pass filters as well as the control of cut-off frequencies and roll-off are well known in the art and many examples of high pass filters can be employed for filter 11. It is, therefore, sufficient to describe the characteristics and the advantages of the filter by terms of function as the circuit configuration could embody many different forms. For examples of suitable high pass filter configurations, reference is made to a text entitled, Radiotron Designers Handbook, published by RCA of Harrison, N.J., 1957, pages 172 to 185. The purpose of the high pass filter as indicated is to enable one to discriminate against the particular type of low frequency noise which may be prevalent at a particular industrial site. The high pass filter 11 serves to reduce the lower frequency components of noise to afford an improved consonant discrimination ability to a user. The high pass filter 11 has its output coupled to the input of an expander module 12. In parallel with the expander module 12 is a compressor 13. An expander is a well known component in the audio field, as is the compressor 13.

Essentially, compression is used to described conditions of gain reduction that are more or less continuous. For example, the maximum volume range of any sound reproduction is the difference in decibels between the maximum sound output and the level of masking by background noise. If the original sound has a greater volume range than the volume range of an audio device, it is usual to compress the range in some way. Many broadcast transmitters, especially those used in FM broadcasting, use volume compression. Alternatively, if the reproduced audio signal is to have the same volume range as in its original form, some type of volume expander is required. One advantage of the use of volume expansion is that it reduces the background noise. The expander 12 possesses a variable expansion ratio as well as the ability to vary the attack and release time constants of the apparatus. The release and attack time is important in both expansion and compression as it determines the gain change in the system as a function of time. It is the rate of gain change that determines loudness. The faster the release time, the more the lower level signal is brought up to peak level. The attack time determines the magnitude of transients allowed to pass through the system.

The system described is capable of operating in multiple modes. Thus, as depicted in FIG. 2, the compressor 13 has associated therewith a switch 14. Activation of the switch serves to disable the compressor to, therefore, operate the system in an expansion mode via the expander 12. The expander 12 operates at an adjustable expansion ratio between the limits of 1.5:1 through 3:1. The expansion ratio is selected as a function of the noise situation and based on the actual masking effect of the noise on the normal ear. Thus, the expansion threshold is adjustable and is defined as the level above threshold that expansion begins and becomes greater than a linear ratio of 1:1. The output of the expander 12 is applied to the input of a compressor and limiter module 15. The compressor limiter module possesses a variable compression threshold. The compression ratio can also be varied to obtain proper output limiting which may for example be 30:1, 20:1, and so on. Essentially, volume compression can be afforded together with limiting which is achieved by an amplifier whose gain is automatically reduced when the average input volume to the amplifier exceeds a pre-determined value. This can be controlled by the average volume of the audio information or alternatively, by the peak volume. In a compression scheme using peak limiting, the amplifiers gain is reduced and slowly restored when the instantaneous peak power of the input exceeds a predetermined value. There are many circuit configurations as indicated above which can provide the range and limits of volume compression and expansion as described. Coupled to the output of the compressor and limiter module 15 is a low pass filter 16. The low pass filter possesses a sharp roll off of, for example, 48db per octave and has adjustable frequency breakpoints between 2,500 to 10,000 Hz. The output of the low pass filter 16 is coupled to an attenuator circuit 17. The attenuator circuit has a flat frequency response and a variable attenuation ratio which can be adjusted from minus 5 to minus 20 db. The output of the attentuator is coupled to a speaker transducer 18 which may be an ultra miniature hearing aid type transducer. As depicted in the figure, the output of speaker 18 which, as will be explained, provides the processed or compensated audio signal to be applied directly to the ear 19 of a user.

As indicated above, the expansion mode together with the high pass filter can serve to eliminate low frequency components of noise. With both the expander 12 and the compressor 13 in operation, the system will produce expansion plus compression to eliminate the higher levels of noise above 90 db which have been documented as harmful to persons employed in high noise environments for extended periods of time. It is noted, however, that the expansion feature will tend to discriminate against these higher levels without compression. In any event, the ability to use both compression and expansion is a function of the particular noise environment present in a plant activity.

The function of the compressor and limiting section 15 is to protect the ear from harmful noise levels which exceed a predetermined threshold. For example, O.S.-H.A. regulations only permit noise exposure at 90 dba for a maximum period of eight hours. The function of the attenuator 17 is to reduce the output in a linear manner again as a function of the industrial noise level. Another important aspect of the attenuator 17 is to prevent peak signals from overloading the channel capacity of the ear.

It is important to note that the combination of expansion and compression operates to improve the signal to noise ratio when the expansion and compression thresholds and levels are adjusted according to the relative intensity, duration and frequency of the background noise. Expansion has the effect of increasing the compressed dynamic range which as been reduced due to the masking effect of background noise. When the signal to noise ratio is unfavorable, the compression and expansion mode can be combined to permit optimum audio transmission in the presence of noise.

Expansion slopes when set up with proper expansion ratio and threshold can yield 10 db to 20 db improvement in the signal to noise ratio. Expansion which is programmable operates to eliminate low level background noise where the speech is above the background noise. The combination of simultaneous expansion and compression improves the signal to noise ratio significantly. Furthermore, by employing a variable high pass filter, one can easily achieve frequency dependant expansion and hence there is a selective expansion of lower frequencies as compared to higher frequencies. Using this technique, compression can be achieved above the expansion threshold. Alternatively, one provides expansion below the compression threshold. The expansion reduces the gain to cause low level ambient noise to be rapidly attenuated which serves to thus reduce the relative level of background noise. The aspect of adjustability in regard to the high pass filter and in regard to the expansion and compression techniques permit one to treat steady state noise and intermittent noise differently. The attack and release time play a major roll as indicated in reducing transients, during the expansion and compression modes. Thus, a variable attack and release time permits one to adjust for a maximum performance as a function of the environment. As depicted in FIG. 2, the use of a variable low pass filter in conjunction with variable compression and expansion threshold devices enable one to provide a compensated signal with an improved signal to noise ratio for most types of industrial noises. The advantages of the system as depicted are as follows:

1. Restoration of reduced or compressed dynamic range of the ear due to the masking effect of noise.
2. Restoration of the auditory threshold to near normal with concomitant reduction in the relative background noise level.
3. Improved speech communication ability.
4. Protection from the deleterious effects of noise.
5. Reduction of auditory fatigue, temporary threshold shift and permanent threshold shift.
6. Release of stress encountered in noisy situations due to the inability to communicate.
7. An increase in the ability of persons to communicate easily without the need of stressing the vocal cords.

Essentially the above described system provides a substantial improvment in permitting one to work safely and reliably in high noise environments.

As indicated, the above described circuit modules are relatively conventional and easily implemented in the prior art, the main features being the combination and characteristics of such circuitry to provide noise reduction in a speech processor.

A high pass filter such as 11 can be implemented with both a controllable frequency response and variable bass roll-off using known techniques. See for an example a text entitled, Guidebook of Electronic Circuits by John Markus, a McGraw Hill Publication, (1974). Chapter 33, entitled, *Active Circuits* on page 252, shows a high pass filter circuit employing FETS and an operational amplifier. The roll-off as well as the frequency cut off can be voltage controlled. Other examples of suitable circuits exist in this chapter. In regard to the expander and compressor circuits the text has many examples of suitable circuitry for use with the apparatus and to achieve optimum values and operation with adjustment threshold ratios, and attack and release times. Chapter 5 of the text is entitled, *Audio Compressor Circuits* and the text contains examples of suitable compressors, expanders as well as attenuators and high and low pass filters. Thus as one can envision, the modules of FIG. 2 can be easily implemented to operate according to the above described characteristics to provide inmproved auditory response for a user in a noisy environment.

Figure 3:
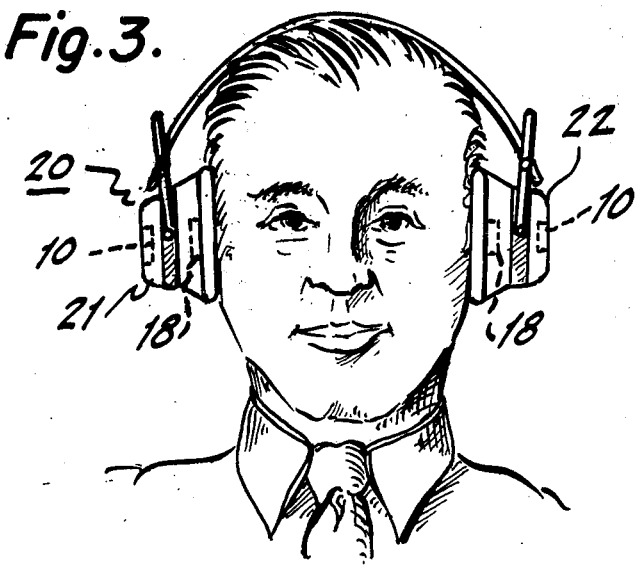
FIG. 3 is a perspective view of a user employing a molded ear phone assembly for use with the invention.

Referring to FIG. 3, there is shown a pair of head phones or ear phones 20, for use in housing the circuitry of FIG. 2. Such head phones 20 are well known in the audio field. The phones 20 can be molded from a plastic or hard rubber and are comfortable and easy to wear and use. Each ear piece as 21 and 22, contains within the internal hollow the apparatus of FIG. 2. The input microphone 10 is located on the outer surface of the housings as 21 and 22. The output speaker 18 is located near the ear of the user. The circuitry coupled between the input microphone 10 and the output speaker 18 is included within the housing. As is known such circuitry can include and be fabricated using integrated circuit techniques and hence the entire package is no largr than conventional hearing aid circuits. The entire unit can be biased from a hearing air or other battery included in each housing as 21 and 22.

It is noted that both a right and a left ear circuit as that depicted in FIG. 2, could be employed in each housing. Since the circuitry described is variable, one could also compensate for any particular defect in hearing on either ear that a user possesses to enable optimum compensation even for employees having hearing loss. For example, if a user has a hearing loss (cochlear damage) he would not be able to respond to certain parts of the audio frequency spectrum. Hence the low pass filter 16 may include notches or attenuation at these components. Thus, if a user has a moderate loss of hearing at 4,000 Hz, this area may be attenuated to eliminate unnecessary distortion products to the damaged ears, due to recruitment loss and soon. The system circuitry can be set up for each user both as a function of his hearing regarding separate adjustment for the right and left ears, while further adjusting the high pass filter 11, and the expander and compressor circuits for the particular noise problem in the plant or area in which the user works. Hence, a particular plant may have large amplitude noise at 1,000 Hz, while another may have such noise components at higher or lower fundamental frequencies.

The particular compensation scheme depicted has other uses and application which will be described in conjunction with FIGS. 4, 5 and 6.

As indicated above, many industrial and other sites, such as airports, auto factories and so on, use ear phones as a means of muffling the noise to enable them to comply with O.S.H.A. standards and for reasons of general safety. In any event, these devices do not muffle the noise by great factors and are only better than nothing at all. In the present embodiment, the use of the ear phones in conjunction with the circuitry enables one to communicate and hear by the substantial noise reduction afforded by the system. Any attenuation of background noise due to the physical emplacement of the ear phones or headset 20 is purely incidental.

It is well known that programmed music serves to reduce fatigue and is widely enjoyed in manufacturing facilities where the noise level is low enough to permit the workers to hear or listen to such formats.

Naturally, where the background noise is high and of the levels discussed, the advantages of music cannot be achieved.

Referring to FIG. 4, there is shown an additional embodiment, which operates in conjunction with the apparatus of this invention.

Shown in FIG. 4, is the front end of the circuitry depicted in FIG. 2, and the same reference numerals have been retained to denote corresponding parts. The input microphone 10 is shown coupled to the high pass filter 11 as above described. The output of the high pass filter 11 is coupled to the expander 12 and compressor 14, and the remaining circuitry is as that shown in FIG. 2.

A radio receiver of FM receiver 40 is shown having an output 41 coupled to the input of the high pass filter, with another input 42 coupled to the microphone 10. An FM receiver is preferred due to the fact that FM can provide better signal to noise ratio than AM and would be a better choice in noisy environments. The FM receiver 40 is mounted within one of the enclosures or housings on the headset and an additional lead 43 is directed to the input of the other low pass filter associated with the other ear piece housing. Complete FM receiver modules as 40 are available on integrated circuit chips as those manufactured by a number of companies including RCA, of Sommerville, N.J. The FM receiver need not be continuously tunable over the FM band of 88 to 108 MHZ, but can be switched tuned to a plurality of channels as 1 through N, wherein each channel is selected by means of a selector switch 45. A volume control 47 is provided for the receiver as is conventional as well as an input antenna 46. Such antennas 46 as well as discrete stepped tuned receivers are also known components.

FIG. 5 depicts a pair of ear phones 50 having incorporated in one housing 51, the FM radio 40. The volume control 47 and the channel selector switch 45 are shown positioned on the outer surface of the ear phone adjacent a screen or opening 52 for use with the input microphone 10. When switch 45 is placed in the Comm. or communicate position the speaker 10 is enabled to allow the user to respond to audio in the environment. When the switch 45 is placed to one of the channel positions (1 to N) the user can then select a station of his choice, such as classical music, news, popular music and so on. In this mode the microphone 10 is disabled.

Referring to FIG. 6, there is shown a transmission scheme which can be employed in conjunction with apparatus as depicted in FIG. 5. A manufacturing facility 60, would possess an FM transmitter 61. The transmitter 61, has a plurality of audio inputs A1 through AN which may be conventional radio outputs tuned to a particular station or tape decks, phonographs and so on to provide A1 to AN unique program formats. Each channel as A1 through AN may have its own antenna as T1 to TN to broadcast at its own carrier frequency F1 through FN. It is, of course, seen that a user 63 having the headset combination of FIG. 5, can then select any channel A1 through AN by adjusting the switch 45.

Also shown coupled to the transmitter 41 is a microphone 70. A plant supervisor can use the microphone 70, to interrupt program transmission and convey general plant information to his employees. The techniques for doing so are also known in the art.

It is understood that the circuits of FIG. 2, will then function to process the FM signal applied to the filter 11 the same way and in the same manner as incoming audio and hence, permit an employee subjected to high noise intensity levels to receive the benefits of programmed music during work. It can, therefore, be ascertained that the system depicted has many other advantages and used in conjunction with high noise environments to enable reliable and efficient communication between users as well as providing him with the capability of selecting music or other programming to alleviate his tasks.

We claim:
1. Audio processor apparatus for providing protection against high intensity noise levels, while relatively restoring auditory acuity for a user with a normal hearing function in a noisy environment, comprising:
   a. Means responsive to a range of audio signals including noise as propagating in an environment, for providing at an output an electrical signal indicative of said range;
   b. a A high pass filter responsive to said electrical signal for substantially attenuating a given predetermined lower frequency portion of said range according to the type of noise present in said environment, to provide a limited range signal at an output;
   c. Audio processing means including an expander for expanding the range of said limited signal according to the type of noise present, to provide an expanded range signal at an output;
   d. Compressor means coupled to said expander and operative to limit the level of said expanded range signal;
   e. Means coupled to said compressor means for providing at an output an audible signal manifesting frequency and intensity characteristics sufficient to compensate for said noise of said environment, whereby a user is provided with said audible signal to restore normal acuity.

2. The audio processor according to claim 1, wherein said means responsive to a range of audio signals comprises a microphone.

3. The audio processor according to claim 1 wherein said high pass filter has an adjustable frequency breakpoint over the range of 250 Hz to 1,500 Hz.

4. The audio processor according to claim 3, wherein said high pass filter has a variable bass roll-over between 6 to 18 db per octave.

5. The apparatus according to claim 1 further comprising, a selectable compressor module in parallel with said expander to enable compression of said expanded range signal for signal intensities above an expansion threshold.

6. The apparatus according to claim 1 wherein said expander means has a variable expansion threshold selected according to the intensity of said background noise.

7. The apparatus according to claim 1 wherein said compressor means has a variable compression ratio selected according to the intensity of said background noise.

8. The apparatus according to claim 1 further including a low pass filter having an input coupled to said compressor means for restricting the band of audio frequencies at said output, and a speaker coupled to said output of said low pass filter for providing said audible signal.

9. The apparatus according to claim 8 further including an attenuator coupled between said low pass filter and said speaker for linearly attenuating said signal applied to said speaker.

10. The apparatus according to claim 1 further including radio receiving means having an output coupled to the input of said high pass filter and means operative to apply a signal from said receiver to said filter during a given mode.

11. The apparatus according to claim 1 wherein said audio processing means has selectable attack and release times, selected according to the characteristics of said background noise.

12. Apparatus for processing an audio signal in the presence of high intensity background noise to permit a user to engage in reliable communication in high noise environments, comprising:
   a. input transducing means operative to provide at an output an electrical signal corresponding to an audio signal plus noise propagating in an environment;
   b. a high pass filter responsive to said electrical signal to propagate all frequency components above a given low frequency value selected according to the noise present in said environment.
   c. means coupled to said filter for expanding and compressing said signal and operative to compress said signal for a predetermined intensity level and to expand said signal for levels below said predetermined level to provide at an output a composite signal manifesting an intensity and frequency range according to said noise level;
   d. limiting means responsive to said composite signal to limit the average intensity of said signal within predetermined limits;
   e. output transducer means coupled to said limiting means for providing a processed audible signal which when applied to the ear of a user in said environment provides reliable auditory information.

13. The apparatus according to claim 12 wherein said limiting means includes a compressor.

14. The apparatus according to claim 12 wherein said high pass filter means is adjustable to provide a propagation of all frequencies above a range between 250 Hz to 1,500 Hz.

15. The apparatus according to claim 12 further comprising a housing having a front wall and a back wall positioned between side walls with said apparatus contained in said housing, said input transducing means located on said front wall and said back wall adapted to coact with the ear of a user to apply said audible signal to the ear of a user.

16. The apparatus according to claim 12 further comprising a low pass filter coupled to said limiting means and responsive to said signal to restrict the range of frequencies at an output of said filter, and means for attenuating said restricted range signal prior to application of the same to said output transducer means.

17. The apparatus according to claim 12 wherein said means coupled to said filter has a variable attack and release time, which time is varied according to the intensity of said audio signal.

18. The apparatus according to claim 12 wherein said output transducing means includes a speaker adapted to be positioned in proximity to the ear of a user.

19. The apparatus according to claim 12 further comprising a radio receiver for receiving transmitted program information and providing an electrical signal indicative of such information at an output, means coupling the output of said receiver to said high pass filter during a first mode and for interrupting said coupling during a second mode.

20. The apparatus according to claim 12 wherein said limiting means is adapted to limit the average intensity of said composite signal.

21. The apparatus according to claim 12 wherein said limiting means is adapted to limit the peak intensity of said composite signal.

* * * * *